Sept. 9, 1969      G. V. CUSHWA      3,465,395
APPARATUS FOR MANUFACTURING BRICK
Original Filed Aug. 17, 1964      2 Sheets-Sheet 2
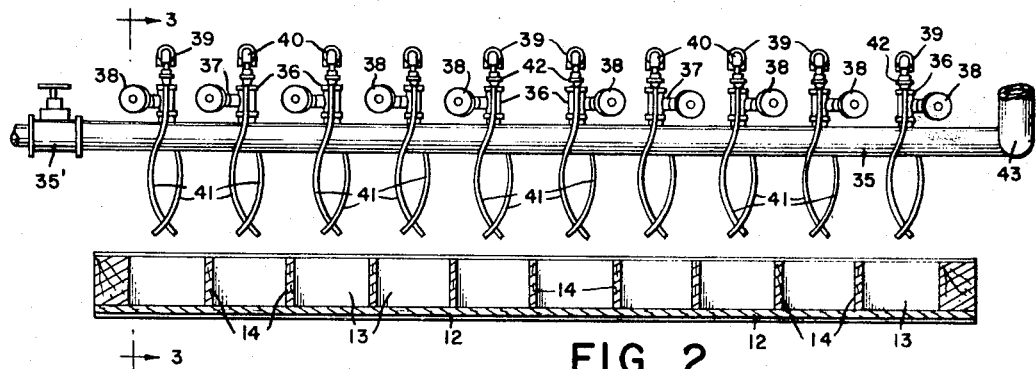
FIG. 2.
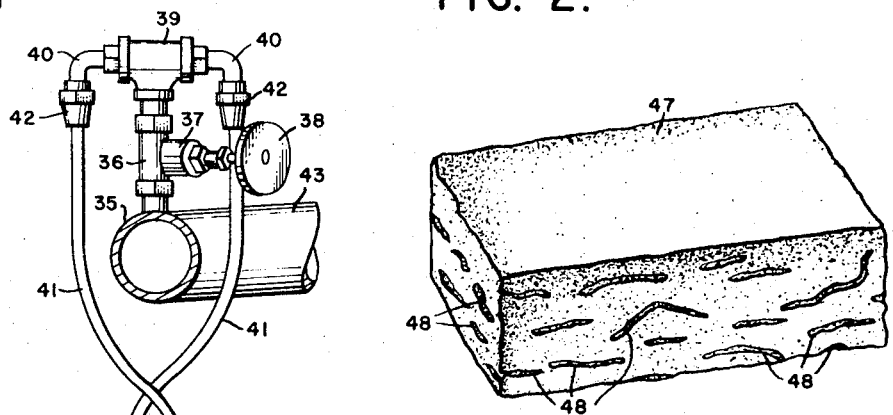
FIG. 5.
FIG. 3.
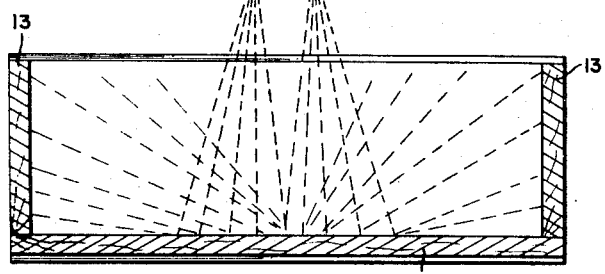
FIG. 4.
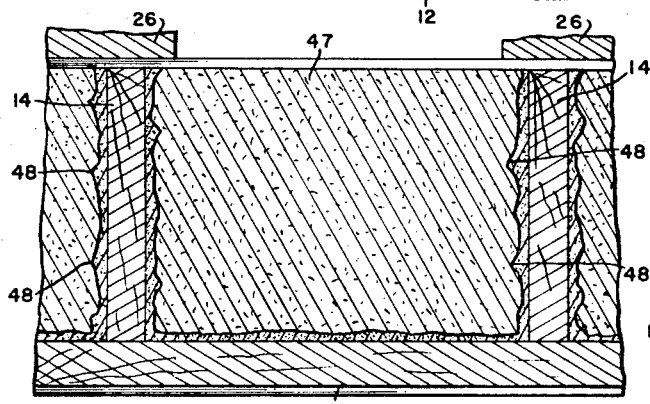
INVENTOR
GEORGE VICTOR CUSHWA
ATTORNEYS United States Patent Office 3,465,395
Patented Sept. 9, 1969

3,465,395
APPARATUS FOR MANUFACTURING BRICK
George Victor Cushwa, P.O. Box 406,
Williamsport, Md. 21795
Original application Aug. 17, 1964, Ser. No. 389,958.
Divided and this application July 20, 1966, Ser. No. 566,544
Int. Cl. B28b 15/00
U.S. Cl. 25—2                                    2 Claims

ABSTRACT OF THE DISCLOSURE

Apparatus for manufacturing brick including a conveyor member for brick molds, a manifold assembly for delivering moisture to the cavity walls of a mold, the assembly including a main pipe having a plurality of moisture outlets in the upper surface of the pipe, delivery means extending downwardly from the outlet to a point proximate the mold cavities, the assembly further including steam generating means connected to the main pipe for applying steam thereto, sanding mechanism for applying sand to the moisturized molds, elevating means for lifting the molds to a point subjacent a platen which forces brick material into the mold, and means for removing the green brick from the mold preparatory to firing.

---

This invention is an apparatus for manufacturing molding brick, and is a division of application, Ser. No. 389,958, filed Aug. 17, 1964, and now abandoned.

For many years, brick had been mechanically molded by the same basic process and machinery illustrated and described, inter alia, in Patents Nos. 1,341,798; 1,452,152; 1,454,165 and 1,779,136. In accordance with this process, brick molds, each having one or more brick-forming cavities, lined with suitable hardwood such as maple, beech or apple, are conveyed to a sanding mechanism which deposits molding sand in the cavities. The mold is then inverted to dump excess sand from the mold, leaving a thin layer of sand on the cavity walls, which adheres thereto, due to the inherent moisture of the wood. This layer of sand acts as a parting agent to facilitate removal of the brick from the mold cavities, and imparts to the brick a desirable and interesting sand surface texture. After the sanding step, soft mud is forced into the mold cavities, following which the brick are separated from the mold and then placed on a pallet for drying and subsequent firing in a kiln.

This cycle is repeated forty to fifty times, after which the mold is taken from the machine for washing to remove the sand and brick material which has collected on the parts thereof. Washing also restores moisture to the wood cavity walls, enabling them to pick up molding sand in sufficient quantity to constitute a satisfactory parting agent. It has been found, however, that with each cycle, the moisture content of the cavity wall surfaces is gradually decreased, thereby reducing the thickness of the layer of sand adhering to the walls, until only a fine dust is retained. Consequently, difficulty is experienced in removing the brick from the mold cavities, necessitating bumping the molds by applying substantial force to the ends thereof to loosen the brick. Frequently this results in distortion of the brick surface and an inadequate sand surface on the brick.

It is an object of this invention to apply moisture to the cavity walls of a brick mold used in the manufacture of brick, prior to each cycle of operation, thereby providing a greater adherence of molding sand thereon, creating a thicker and a more uniform parting agent, which facilitates removal of the brick from the mold and promotes a heavier sand surface on the brick.

Another object is to manufacture brick in the above-described manner, which permits use of coarser granules of sand than has heretofore been employed, the adherence of which, to the walls of the mold cavities, in larger quantities, produces folds in the brick material when it is forced into the mold, effecting a finished brick having the appearance and texture of hand-molded brick.

Other objects are to provide a manifold carrying a moisturizing agent, which is positioned superjacent the path of the mold, the manifold including outlet means for delivering the moisturizing agent to each cavity of the mold prior to depositing sand therein; to provide a manifold of the character described, for delivering steam to the mold cavities, the steam condensing on the cavity walls to supply moisture uniformly to the wood; and to provide apparatus for applying moisture to mold cavities which may be readily and uniformly incorporated in conventional brick-making machinery, the operation of which moisturizing mechanism is automatically controlled to inject moisture into the mold cavities, just prior to the entry of the mold into the sanding mechanism.

Other objects of the invention will be manifest from the following description of the present preferred form of the invention, taken in connection with the accompanying drawings, wherein:

FIG. 2 is a fragmentary front elevational view of the manifold assembly of the present invention, illustrating its use with a brick mold, the mold being shown in section;

FIG. 3 is an enlarged sectional view taken along the lines 3—3 of FIG. 2, looking in the direction of the arrows, and illustrating the operation of the present invention;

FIG. 4 is an enlarged fragmentary sectional view of a brick mold, illustrating the formation of brick having the appearance of hand-molded brick, forming a part of the present invention; and FIG. 5 is a perspective view of a brick having the appearance of hand-molded brick, made in accordance with the present invention.

Figure 1:
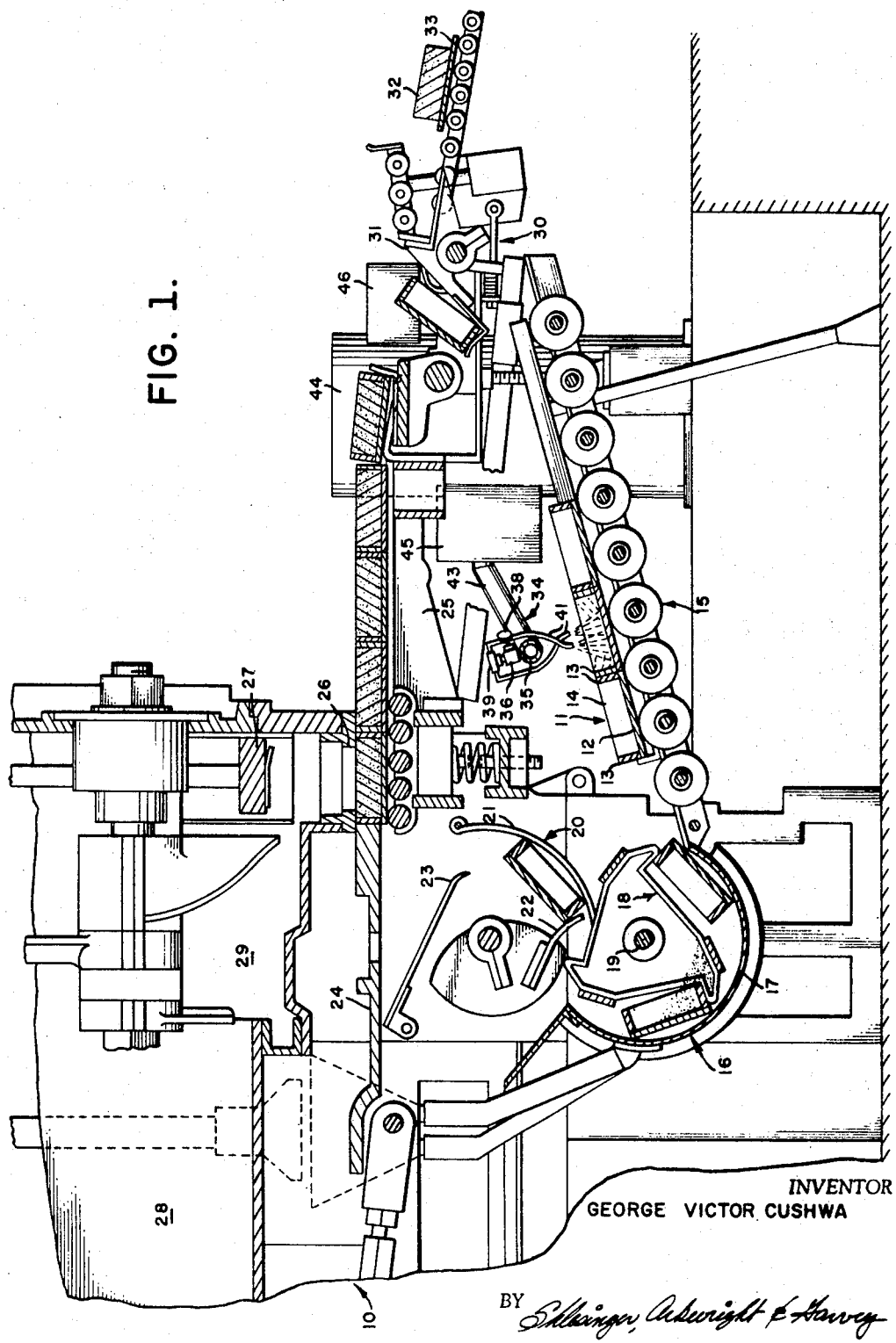
FIG. 1 is a diagrammatic view of a conventional brick making machine illustrating the application of the present invention thereto.

Referring now in greater detail to the drawings, in FIG. 1 there is diagrammatically illustrated, an automatic brick making machine 10, such as a Lancaster AutoBrik machine manufactured by Posey Iron Works, Lancaster, Pa., adapted for the reception of brick molds 11 which are of standard construction. Every mold 11 is provided with a plurality of cavities, each having a bottom wall 12, end walls 13 and side walls 14. These walls are preferably of hardwood construction, such as maple, beech or apple. Machine 10 includes an inclined conveyor 15 for delivering molds 11 to a sanding mechanism 16 which includes a sand-containing member 17. Rotatable mold-retaining elements 18 are located within member 17 and are actuated by suitable means 19. Elements 18 serve to move molds 11 through the sand in the bottom of member 17, thereby enabling the sand to enter the cavities of each mold, following which the mold is carried upwardly and inverted to dump excess sand therefrom, leaving a thin layer of sand on the cavity walls, which serves as a parting agent. Mechanism 16 then delivers the mold to a mold-elevating unit 20. Unit 20 includes a mold-engaging arcuate wall surface 21 which, in cooperation with a movable arm 22, lifts the mold to a receiver 23, whereupon the latter is swung upwardly to a horizontal position to deliver the mold to the proper position for filling. A mold push-out 24 is then actuated to move the mold horizontally to a support 25, subjacent a die 26, through which soft mud or other suitable brick material is forced by a platen 27. A pug mill 28 feeds the brick material to a charging chamber 29 which is adapted to move the material into the path of movement of the platen 27.

After the soft mud or the like is forced into the mold cavities, the mold is conveyed to a removal station, generally designated 30. Station 30 includes a bumping mechanism (not shown) for applying force to the ends of the mold to loosen the bricks from the wall cavities, adjacent which is an inverting, separating, and discharging mechanism 31 which removes the formed brick 32 from mold 11 and places it on a pallet 33 for delivery to a dry kiln.

It is within the contemplation of the present invention to locate a moisturizing assembly 34 in proximity to conveyor 15, which moisturizing assembly is adapted to apply moisture to the cavity walls immediately prior to the entry of each mold into sanding mechanism 16 (see FIG. 1).

Moisturizing assembly 34 preferably includes a manifold comprising a main delivery pipe 35 which extends transversely of conveyor 15 and molds 11. At predetermined intervals of its length, corresponding in number and position, to the cavities of mold 11, there are provided upwardly extending connections 36, in which is located a control valve 37, operated by a handle 38. The upper terminal of connection 36 is joined to a T connection 39, to which are joined elbows 40, the free terminals of which extend downwardly. Delivery tubes 41 are joined to elbows 40 by suitable fittings 42. Delivery tubes 41 are preferably made of a flexible material such as copper, to permit bending of the lower terminals thereof, to orient the same with respect to the mold cavities for obtaining best results.

Although any suitable moisturizing agent may be employed in carrying out the objects of the present invention, optimum results are obtainable by employing steam as the moisturizing agent, in which case one terminal of main pipe 35 is joined by a connecting pipe 43, to a steamer 44 of conventional construction. A solenoid valve 45, such as valve number 137150 manufactured by the Magnetrol Valve Corporation is positioned adjacent steamer 44 for feeding steam to the main pipe 35 at predetermined intervals as the mold passes beneath the assembly. Operation of the solenoid valve is effected by a conventional control switch 46, such as a Square D proximity switch Type QO 21 which may be located adjacent a reciprocating part of machine 10 such as inverting, separating and discharging mechanism 31. The exact position of the switch controls both the timing and duration of spray cycle. The free terminal of pipe 35 is controlled by a valve 35' and the pipe is inclined slightly downwardly to permit the drainage of condensed steam therefrom.

In actual use of the present invention, steam is delivered at intervals to steam pipe 35 under suitable pressure. A pressure of 5 p.s.i. has been found suitable for the present purposes. The steam, passing through pipe 35, rises upwardly through connection 36, connection 39, into elbows 40 whereupon it passes through fitting 42 into delivery tubes 41 where the steam is expelled therefrom, as illustrated in FIG. 3. This steam is deflected from bottom wall 12 of the cavity wall, onto end walls 13 and side walls 14, where it condenses and moisturizes the wooden walls. By delivering the steam upwardly from main pipe 35 rather than directly downwardly from the bottom of the pipe, no condensation is dripped by the present assembly into the molds, thereby effecting uniform application of moisture to the cavity walls. Valve 37 is provided in each unit to permit individual control of steam to a particular mold cavity thereby permitting even greater uniformity in the application of moisture to the various cavities of the mold.

The application of steam to the cavity walls restores moisture to the wooden cavity walls, thereby permitting the latter to pick up more sand, and larger particles of sand, as the molds are passed through the sanding mechanism of the machine, resulting in a thicker parting agent which considerably reduces the amount of force with which the molds must be bumped to effect removal of the brick therefrom, thereby obviating damage to the brick by more forceful bumping, as has been necessary in the past, and resulting in a heavier and more ethetic sand surface texture to the brick.

Since the moisture which is applied to the cavity walls by the steam is uniform, the application of the same to the walls is also uniform and the brick themselves are uniformly coated. In addition to the benefit of facilitating removal of the brick from the molds, the thicker and more uniform coating lends a more pleasing appearance to the brick after firing in the kiln and eliminates bare unsanded areas on the brick faces heretofore prevalent with conventional processes.

The apparatus of the present invention is readily adapted for the manufacture of brick, the surface of which has the appearance of hand-molded brick. This is accomplished by following the same procedure set out above, but wherein a coarser molding sand can be employed. By virtue of the increased moisture of the walls of the mold cavities, coarser granules of sand will adhere to the walls. Then, as illustrated in FIG. 4, when the soft mud or other brick material is forced by platen 27 through die 26, the soft mud deposited in the mold cavities drops to the bottom thereof and then moves outwardly under force towards the side and end walls of the cavities. As shown in FIG. 4, the outward movement of the soft mud traps particles of the sand, forming sand seams between the lateral extremities of the formed brick 47 and the walls. This results in the formation of folds 48 on the end, side, and bottom walls of the brick, giving the brick, when removed from the mold, the appearance of hand-molded brick, as shown in FIG. 5. These folds are indiscriminately formed in the brick surface, so that in each brick, the number, location and size of the folds differ, with the result that each brick has its own unique appearance. Variation in the folds may also be effected by increasing or decreasing the amount of force with which the soft mud or other brick material is inserted into the molds.

For the manufacture of brick having the appearance of hand-molded brick, sand of varying coarseness is preferably used. It has been found that with the apparatus of the present invention, in addition to the finer grains, particles retained by a 35 mesh screen will adhere to the moisture-conditioned walls of the molds.

It is of course understood that the present invention may be adapted for use in conditioning molds having one or more cavities and that numerous other means, such as an atomized spray may be employed to apply moisture to the mold cavity walls.

While a preferred embodiment of the invention has been shown and described, it is nevertheless to be understood that various changes may be made therein, without departing from the spirit and scope of the appended claims.

I claim:

1. In a machine for molding brick, a manifold assembly for delivering moisture to the cavity walls of a mold and adapted for placement superjacent the path of movement of the brick mold, said assembly including a main delivery pipe, connections extending upwardly at intervals from the upper surface of said delivery pipe, a T connection connected to the upper terminal of each of said connections, delivery tubes engaged with said T connection and extending downwardly, said delivery tubes being made of a flexible material to permit orientation thereof with respect to the mold cavities, a control valve located in each of said connections, and a steamer in operative engagement with one end of said delivery pipe for delivering steam thereto to be expelled from said delivery tubes, said delivery pipe being inclined in a direction to permit drainage of condensed steam from the free terminal of said delivery pipe, whereby only steam is permitted to pass into said delivery tubes and condensed steam is retained in said main pipe.

2. In a machine for molding brick, a manifold assembly for delivering moisture to the cavity walls of a mold, the assembly being located superjacent the path of movement of the brick mold, said assembly including a main pipe, a plurality of moisture outlets in the upper surface of said main pipe, delivery tubes extending downwardly from the outlets exteriorly of the main pipe to a point proximate the mold cavities, steam generating means connected to said main pipe for supplying steam thereto, and valve means connected to the outlets of the main pipe to regulate the steam delivered to each of said delivery tubes, whereby only steam is permitted to pass into said delivery tubes and condensed steam is retained in said main pipe.

References Cited
UNITED STATES PATENTS

| | | | |
|---|---|---|---|
| 1,084,842 | 1/1914 | Bustin | 239—536 |
| 1,991,013 | 2/1935 | Cline | 117—5.1 |
| 3,003,177 | 10/1961 | Hijika | 239—602 X |

FOREIGN PATENTS 16,202    5/1912    Great Britain.

J. SPENCER OVERHOLSER, Primary Examiner

JOHN S. BROWN, Assistant Examiner

U.S. Cl. X.R.

25—41; 239—551, 602